United States Patent
Lu et al.

(10) Patent No.: US 12,418,237 B2
(45) Date of Patent: Sep. 16, 2025

(54) POWER SYSTEM WITH ADAPTIVE MINIMUM FREQUENCY

(71) Applicant: Monolithic Power Systems, Inc., Kirkland, WA (US)

(72) Inventors: Jiangheng Lu, Livermore, CA (US); Siran Wang, Hangzhou (CN)

(73) Assignee: Monolithic Power Systems, Inc., Kirkland, WA (US)

( * ) Notice: Subject to any disclaimer, the term of this patent is extended or adjusted under 35 U.S.C. 154(b) by 266 days.

(21) Appl. No.: 18/071,853

(22) Filed: Nov. 30, 2022

(65) Prior Publication Data

US 2024/0178744 A1    May 30, 2024

(51) Int. Cl.
  *H02M 3/00*     (2006.01)
  *H02M 1/00*     (2007.01)
  *H02M 3/335*    (2006.01)

(52) U.S. Cl.
  CPC ......... *H02M 3/015* (2021.05); *H02M 1/0058* (2021.05); *H02M 3/01* (2021.05); *H02M 3/33571* (2021.05)

(58) Field of Classification Search
  CPC ...... H02M 1/0058; H02M 1/083; H02M 3/01; H02M 3/015
  See application file for complete search history.

(56) References Cited

U.S. PATENT DOCUMENTS

| | | | | |
|---|---|---|---|---|
| 8,238,123 | B2* | 8/2012 | Zhang | H02M 3/338 363/21.13 |
| 8,687,387 | B2* | 4/2014 | Li | H02M 3/156 363/21.13 |
| 10,263,528 | B2 | 4/2019 | Ouyang | |
| 11,051,377 | B1* | 6/2021 | Xiong | H05B 47/25 |
| 2013/0221758 | A1* | 8/2013 | Kai | H02J 50/10 307/104 |
| 2014/0085938 | A1* | 3/2014 | Shi | H02M 3/33523 363/21.01 |
| 2014/0211515 | A1* | 7/2014 | Tomioka | H02M 3/33571 363/21.02 |
| 2015/0049515 | A1* | 2/2015 | Zhao | H02M 3/33507 363/17 |
| 2016/0190945 | A1* | 6/2016 | Liu | H02M 3/3376 363/21.02 |
| 2016/0241145 | A1* | 8/2016 | Matsuura | H02M 1/14 |
| 2017/0012541 | A1* | 1/2017 | Ye | H02M 1/4258 |
| 2017/0093296 | A1* | 3/2017 | Chen | H02M 1/088 |
| 2018/0019677 | A1* | 1/2018 | Chung | H03J 1/0091 |
| 2020/0067407 | A1* | 2/2020 | Kashiwagi | H02M 3/156 |
| 2022/0385193 | A1* | 12/2022 | Lai | H02M 7/5387 |

* cited by examiner

*Primary Examiner* — Gustavo A Rosario-Benitez
(74) *Attorney, Agent, or Firm* — Perkins Coie LLP

(57) ABSTRACT

A power system with adaptive minimum frequency is disclosed. The power system includes a resonant converter and a control circuit. Under the control of the control circuit, the resonant converter works with an adaptive minimum frequency. The value of the adaptive minimum frequency is preset and is selected by an equivalent resistance or an output voltage of the resonant converter.

11 Claims, 4 Drawing Sheets

POWER SYSTEM WITH ADAPTIVE MINIMUM FREQUENCY

TECHNICAL FIELD

The present invention relates generally to electronic circuits, and more particularly but not exclusively to power systems with resonant converters.

BACKGROUND

A resonant circuit enables a resonant converter to change its gain (e.g., to compensate for changes at its input and/or the requirements of a load) by adjusting switching frequency of power switches of the resonant converter. The resonant converter may operate the power switches over a wide range of switching frequencies to achieve the required output voltage or current at the required time. The gain of the resonant converter over a wide range of switching frequencies for different values of quality factor Q is plotted as shown in FIG. 1. It can be seen that each gain curve has a peak which defines the boundary between an inductive and a capacitive impedances of the resonant converter, hence an inductive operation region and a capacitive operation region are defined as shown in FIG. 1, wherein the left of the dotted line is the capacitive operation region, and the right of the dotted line is the inductive operation region. The objective of defining both regions is to maintain an inductive operation across an entire input voltage and output voltage/current ranges, and never fall into the capacitive operation region. Such requirement is due to that Zero Voltage Switching (ZVS) for saving the switching loss is only achieved in the inductive operation region.

As can be seen from FIG. 1, the peaks of the different gain curves are located at different switching frequencies. To make sure the resonant converter works in the inductive operation region under all input and output conditions, a minimum switching frequency is set. However, with the minimum switching frequency limit, a maximum available output voltage on the gain curve with smaller Q is limited. To expand the output voltage range for gain curve with small Q, higher input voltage are required, and may lead to higher requirement for the devices of the resonant converter and increase the cost.

SUMMARY

It is an object of the present invention to set an adaptive minimum switching frequency for a power system with a resonant converter to achieve a wide input/output range, with reduced current and voltage stress to the devices in a resonant converter.

In accomplishing the above and other objects, there has been provided, in accordance with an embodiment of the present invention, a power system comprising: a resonant converter, configured to convert an input voltage to an output voltage to power a load; and a control circuit, configured to provide a drive control signal for controlling the resonant converter working with a frequency having a minimum value varied based on the output voltage.

In accomplishing the above and other objects, there has been provided, in accordance with an embodiment of the present invention, a control circuit of a resonant converter, wherein the resonant converter provides an output voltage and an output current to power a load, comprising: a minimum frequency circuit, configured to provide a minimum frequency signal based on the output voltage of the resonant converter; and a control unit, configured to provide a drive control signal for controlling the resonant converter working with a frequency having a minimum value determined by the minimum frequency signal.

In accomplishing the above and other objects, there has been provided, in accordance with an embodiment of the present invention, a control method for controlling a resonant converter, wherein the resonant converter works with a frequency and provides an output voltage and an output current to a load, the control method comprising: presetting at least two minimum values for a lower limit of the frequency of the resonant converter; and selecting one of the at least two minimum values as the lower limit of the frequency of the resonant converter based on the output voltage of the resonant converter.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 2:
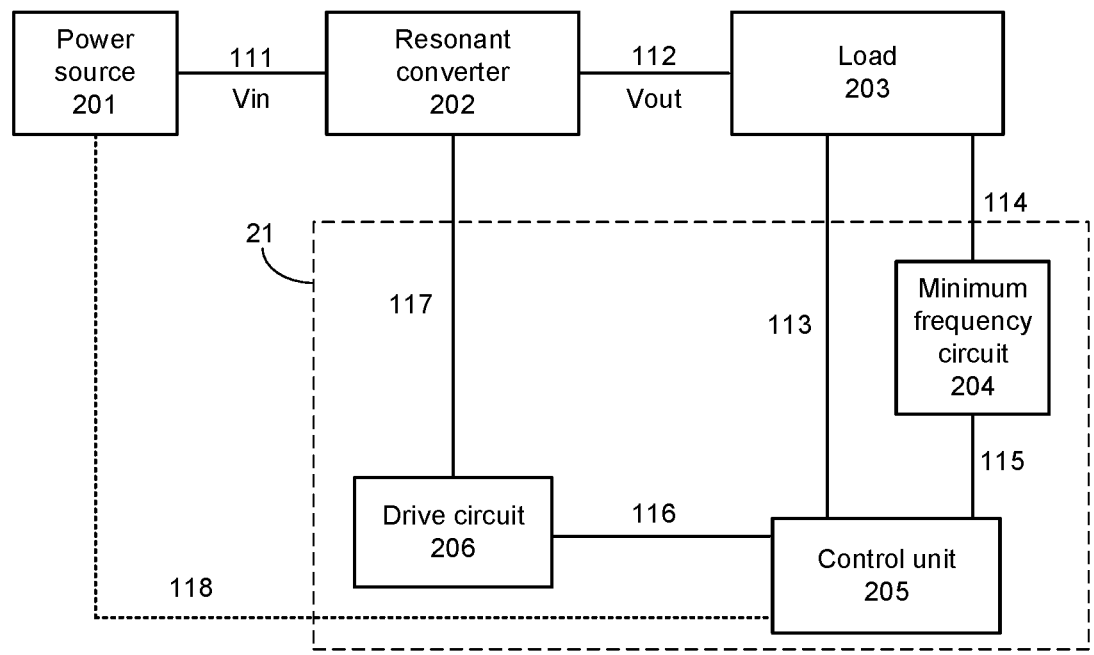
FIG. 2 schematically shows a power system 20 in accordance with an embodiment of the present invention.

FIG. 2 schematically shows a power system 20 in accordance with an embodiment of the present invention. As shown in FIG. 2, the power system 20 includes a power source 201, a resonant converter 202, a load 203 and a control circuit 21 for controlling the resonant converter 202. The control circuit 21 includes a minimum frequency circuit 204, a control unit 205 and a drive circuit 206. The resonant converter 202, the load 203, the minimum frequency circuit 204, the control unit 205 and the drive circuit 206 may be independent or may represent any combination of one or more components that provide the functionality of the power system 20 as described herein.

The power source 201 provides electrical energy, in the form of power, at link 111. Numerous examples of the power source 201 exist and may include, but are not limited to, power grids, generators, power transformers, batteries, or any other form of electrical power devices capable of providing electrical power to the power system 20. As referred to herein, the voltage that the power source 201 provides is "the input voltage Vin" of the power system 20.

The load 203 receives, via a link 112, electrical power (e.g., voltage, current, etc.) provided by the power source 201 and converted by the resonant converter 202. Numerous examples of the load 203 exist and may include, but are not limited to, computing devices and related components, such as microprocessors, electrical components, circuits, laptops, desktop computers, mobile phones, or any other type of electrical device and/or circuitry that receives a voltage or a current from a resonant converter.

The resonant converter 202 is a switch-based power converter that converts the electrical energy provided by the power source 201 into a usable form of electrical power required by the load 203 by relying, during at least some of its switching cycles, on zero voltage switching across one or several power switches. Examples of the resonant converter 202 include any type of LLC converter, LCC converter, CLLC converter, CLLLC converter or the like.

Together, the minimum frequency circuit 204, the control unit 205 and the drive circuit 206 control the resonant converter 202 to vary the amount of power provided to the load 203. The control unit 205 may be coupled to the drive circuit 206 via link 116 to send drive control signals or commands to the drive circuit 206 for controlling the operations of the resonant converter 202. For example, the control unit 205 may vary the drive control signals sent to the drive circuit 206 so as to vary the switching frequency of the resonant converter 202 to increase or decrease the output voltage Vout provided to the load 203. The control unit 205 is coupled to the load 203 via link 113, and the minimum frequency circuit 204 is coupled to the load 203 via link 114. Each of the control unit 205 and the minimum frequency circuit 204 receives required information indicative of the various electrical characteristics (e.g., voltage levels, current levels, etc.) associated with the load 203. The minimum frequency circuit 204 receives the load information, and provides a minimum frequency signal to the control unit 205 via the link 115. In some embodiments, the control unit 205 may also be coupled to the power source 201 via link 118 to monitor the power source 201 and to control the corresponding operations.

The control unit 205 may comprise any suitable arrangement of hardware, software, firmware, or any combination thereof, to perform the techniques attributed to the control unit 205 herein. For example, the control unit 205 may include switching control circuits with a current loop, a voltage loop or a combination of both. Also, the control unit may be implemented by digital solution, and may include any one or more microprocessors, digital signal processors (DSPs), application specific integrated circuits (ASICs), field programmable gate arrays (FPGAs), or any other equivalent integrated or discrete logic circuitry, as well as any combination of such components. When the control unit 205 includes software or firmware, the control unit 205 further includes any necessary hardware for storing and executing the software or firmware, such as one or more processors or processing units.

The control unit 205 may provide one or more drive control signals across the link 116 that the drive circuit 206 uses to generate one or more gate control signals that cause the power switches of the resonant converter 202 to be on and off.

In some embodiments, the control unit 205 and the drive circuit 206 may together, vary the amount of power that passes from the power source 201 to the load 203, by varying a duty cycle and/or a switching frequency of the gate control signal(s) provided via the link 117. The gate control signal(s) are generated in response to the drive control signal(s) provided by the control unit 205 based on the information received from the load 203 and/or the power source 201. In this way, the control unit 205 and the drive circuit 206 together control the power transfer between the power source 201 and the load 203.

The links 111, 112, 113, 114, 115, 116, 117 and 118 electrically couple the components of the power system 20. Each of the links 111, 112, 113, 114, 115, 116, 117 and 118 represent any wired or wireless medium capable of conducting electrical power or electrical signals from one location to another. Examples of the links 111, 112, 113, 114, 115, 116, 117 and 118 include, but are not limited to, physical and/or wireless electrical transmission mediums such as electrical wires, electrical traces, and the like.

Figure 3:
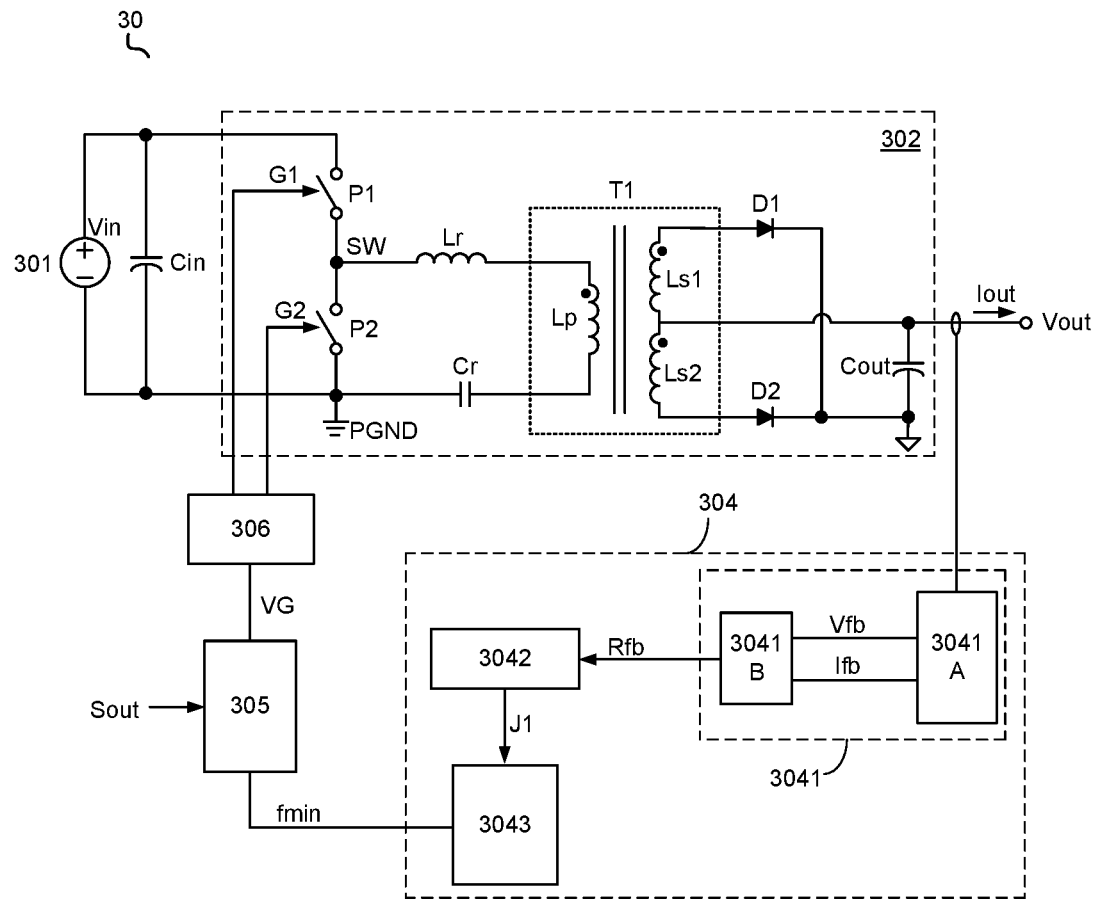
FIG. 3 schematically shows a power system 30 in accordance with an embodiment of the present invention.

FIG. 3 schematically shows a power system 30 in accordance with an embodiment of the present invention. As shown in FIG. 3, the power system 30 includes a power source 301, a resonant converter 302, a minimum frequency circuit 304, a control unit 305 and a drive circuit 306 which may be independent or may represent any combination of one or more components that provide the functionality of the power system 30 as described herein.

The resonant converter 302 has an input terminal configured to receive an input voltage Vin from the power source 301, and an output terminal configured to provide an output voltage Vout and an output current Iout to a load, like the load 203 in FIG. 2. The resonant converter 302 includes: a high side power switch P1 and a low side power switch P2 coupled in a half-bridge way, a transformer T1 having a primary winding Lp, a first secondary winding Ls1 and a second secondary winding Ls2, a resonant capacitor Cr, a first diode D1 and a second diode D2. The primary winding Lp is coupled in series with the resonant capacitor Cr between a switching node SW and a primary ground reference PGND, wherein the switching node SW is a connection node of the high side power switch P1 and a low side power switch P2. A resonant inductor Lr shown in FIG. 3 could be a discrete component couple in series with the primary winding Lp and the capacitor Cr, or could be a symbol representing leakage inductance of the transformer T1. The first diode D1 is coupled in series with the first secondary winding Ls1 to form a current loop for a current flowing through the first secondary winding Ls1, and the second diode D2 is coupled in series with the second secondary winding Ls2 to form a current loop for a current flowing through the second secondary winding Ls2. The current loop with the first diode D1 and the current loop with the second diode D2 alternately provide the output current Iout to the load, and meanwhile charge an output capacitor Cout.

The minimum frequency circuit 304 includes: an equivalent resistance detecting circuit 3041, a selecting signal generating circuit 3042 and a minimum frequency selecting circuit 3043. The equivalent resistance detecting circuit 3041 has a first input terminal and a second input terminal coupled to the output terminal of the resonant converter 302 to respectively detect the output voltage Vout and the output current Iout of the resonant converter 302, and an output terminal configured to provide an equivalent resistance signal Rfb based on the output voltage Vout and the output current Iout. The selecting signal generating circuit 3042 has an input terminal coupled to the output terminal of the equivalent resistance detecting circuit 3041 to receive the equivalent resistance signal Rfb, and an output terminal configured to provide a selecting signal J1 based on the equivalent resistance signal Rfb. The minimum frequency selecting circuit 3043 has a control terminal coupled to the output terminal of the selecting signal generating circuit 3042 to receive the selecting signal J1, and an output terminal configured to provide a minimum frequency signal fmin based on the selecting signal J1, wherein the value of the minimum frequency signal fmin is preset and is selected by the selecting signal J1.

In the embodiment of FIG. 3, the equivalent resistance detecting circuit 3041 includes a feedback detecting circuit 3041A and a resistance calculating circuit 3041B. The feedback detecting circuit 3041A detects the output voltage Vout and the output current Iout, and provides a voltage feedback signal Vfb indicative of the output voltage Vout, and a current feedback signal Ifb indicative of the output current Iout. The resistance calculating circuit 3041B receives the voltage feedback signal Vfb and the current feedback signal Ifb, and provides the equivalent resistance signal Rfb based on a calculating result of the voltage feedback signal Vfb and the current feedback signal Ifb, specifically, Rfb=Vfb/Ifb=Vout/Iout. It should be known that, the output voltage Vout is represented by the voltage feedback signal Vfb, and the output current Iout is represented by the current feedback signal Ifb, thus the value of the equivalent resistance signal Rfb, which is a quotient of the output voltage Vout and the output current Iout, could be obtained by Vfb/Ifb.

The feedback detecting circuit 3041A may include any prior art current/voltage sense circuits, and isolating feedback circuits for passing signals between isolated sides, like a transformer or an optocoupler. The resistance calculating circuit 3041B includes a calculating circuit performing the function of dividing the voltage feedback signal Vfb by the current feedback signal Ifb to generate the equivalent resistance signal Rfb.

The selecting signal generating circuit 3042 may comprise a comparison circuit, which compares the equivalent resistance signal Rfb with at least one resistance threshold signals to provide a comparison result to indicate the value range of the equivalent resistance signal Rfb, so that to provide the selecting signal J1 accordingly. And then the selecting signal J1 is provided to the minimum frequency selecting circuit 3043 to select the value of the minimum frequency signal fmin. It should be understood that the selecting signal J1 is not necessary a single signal, it may present as a set of signals, e.g., the selecting signal J1 may be a set of the comparison signals based on the comparison result of the equivalent resistance signal Rfb with the at least one resistance threshold signals.

In some embodiments, the selecting signal generating circuit 3042 may be implemented by a digital circuit, like an ADC (Analog-Digital Converting circuit). In that case, the selecting signal J1 is a digital signal has as many digits as required.

The control unit 305 receives the minimum frequency signal fmin, together with a load information signal Sout representing the output voltage Vout, the output current Iout or both, that the control unit 305 needs, and provides a drive control signal VG based thereon. In the present invention, any control circuit for controlling a half bridge with a frequency limited by the minimum frequency signal fmin as shown in FIG. 3 could be used.

The drive circuit 306 receives the drive control signal VG, and generates a first gate control signal G1 and a second gate control signal G2 based on the drive control signal VG. In one embodiment, one of the first gate control signal G1 and the second gate control signal G2 has a same phase with the drive control signal VG, while the other one has an opposite phase. Both of the first gate control signal G1 and the second gate control signal G2 are enhanced by the drive circuit 306 to have enough drive capability, and then turn on and off the high side power switch P1 and the low side power switch P2 alternately.

The drive circuit 306 may include logic circuits to generate the first gate control signal G1 and the second gate control signal G2 with opposite phases, and buffers to enhance the driving capability of the first gate control signal G1 and the second gate control signal G2.

Figure 4:
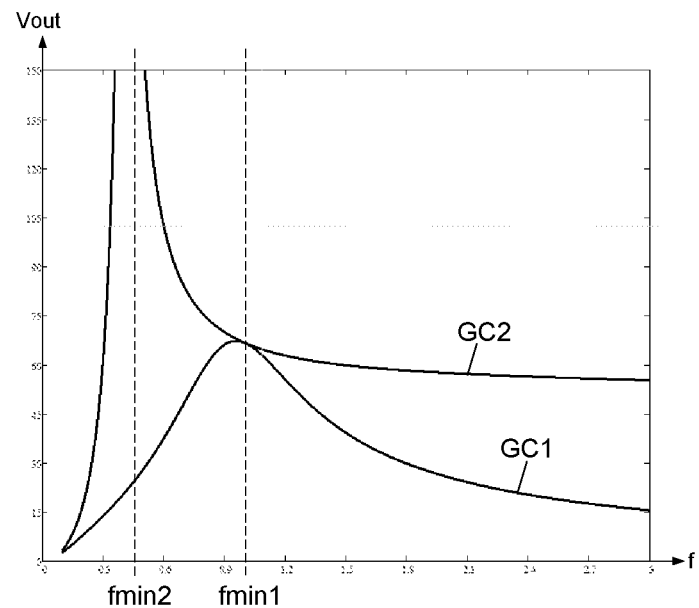
FIG. 4 schematically shows the gains of the power system 30 over a wide range of the switching frequencies with different equivalent resistance in accordance with an embodiment of the present invention.

FIG. 4 schematically shows the gains of the power system 30 over a wide range of the switching frequencies with different quality factors, in accordance with an embodiment of the present invention. As can be seen from FIG. 4, a first minimum frequency f1 and a second minimum frequency f2 are preset for the power system 30. In one embodiment, the selecting signal generating circuit 3042 includes a comparator, the comparator compares the equivalent resistance signal Rfb with a resistance threshold signal Ref. When the equivalent resistance signal Rfb is smaller than the resistance threshold signal Rref, the minimum frequency signal fmin has a value associated with the first minimum frequency f1, which makes the drive control signal VG switch the high side power switch P1 and the low side power switch P2 with a lower limit defined by the first minimum frequency f1. When the equivalent resistance signal Rfb is larger than the resistance threshold signal Rref, the minimum frequency signal fmin has a value associated with the second minimum frequency f2, which makes the drive control signal VG switch the high side power switch P1 and the low side power switch P2 with a lower limit defined by the second minimum frequency f2.

The gain curve GC1 represents the gain of the power system 30 when working with a lower equivalent resistance, while the gain curve GC2 represents the gain of the power system 30 when working with a higher equivalent resistance. As can be seen from FIG. 4, the first minimum frequency f1 properly divides the inductive operation region and the capacitive operation region for the gain curve GC1. However, with the limit of the first minimum frequency f1, most part of the inductive operation region of the gain curve GC2 is wasted, and high output voltage could not be reached when the input current and the input voltage are maintaining unchanged. In the embodiment of FIG. 4, the second minimum frequency f2 is set for the gain curve GC2. By using a lower minimum frequency limit, i.e., f2, the available inductive operation region of the gain curve GC2 is expanded, i.e., the resonant converter 302 is allowed to extend its switching frequency lower, thus sufficient gain and higher voltage can be reached under the same condition.

The first minimum frequency f1 and the second minimum frequency f2 are preset according to the gain curves of the application and are selected based on the equivalent resistance Rfb of the resonant converter 302, which effectively prevent the resonant converter 302 working in the capacitive operation region.

It should be understood that the embodiment in FIG. 4 with two optional minimum frequencies is for illustration and provides an easy way to understand the present invention. In other embodiments, there may be more optional frequencies to provide a more flexible solution, i.e., a plurality of minimum frequency could be preset, and be selected based on the selecting signal J1.

Figure 1:
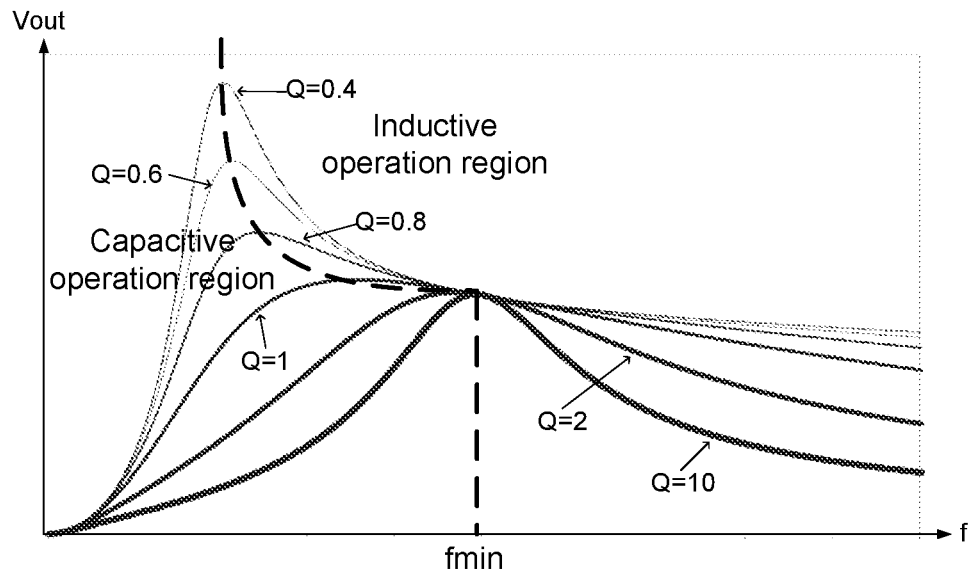
FIG. 1 shows prior art gain curves of a resonant converter with different quality factors.

The plurality of minimum frequency is preset according to the specs of the application. For example, persons of ordinary skill in the art could set a frequency corresponds to the peak of the gain curve, or a frequency on the right of the peak (as shown in FIG. 1) of the gain curve, as the minimum frequency of the corresponding gain curve. Then these minimum frequencies are divided to several groups according to different output voltage ranges, different equivalent resistance ranges, or other specs of the resonant converter. The largest minimum frequency in the group is preset as the minimum frequency for the associated output voltage range or the associated equivalent resistance range. As a result, by the selecting signal J1, the minimum frequency is selected for corresponding equivalent resistance or the corresponding output voltage of the resonant converter.

In some embodiments, the minimum frequency selecting circuit 3043 includes a look-up table. The look-up table may have at least two preset frequency values associated with different values of the selecting signal J1 respectively. The frequency values in the look-up table, and the corresponding relation of the frequency values and the selecting signal J1, are determined by specs of the application, like the inductance of the transformer T1 and the capacitance of the resonant capacitor Cr, etc. In one embodiment, the look-up table could be set by users via a digital interface to the minimum frequency circuit 304.

In other embodiments, the minimum frequency selecting circuit 3043 may include other circuits which could provide the minimum frequency signal fmin with different values in response to the selecting signal J1.

Figure 5:
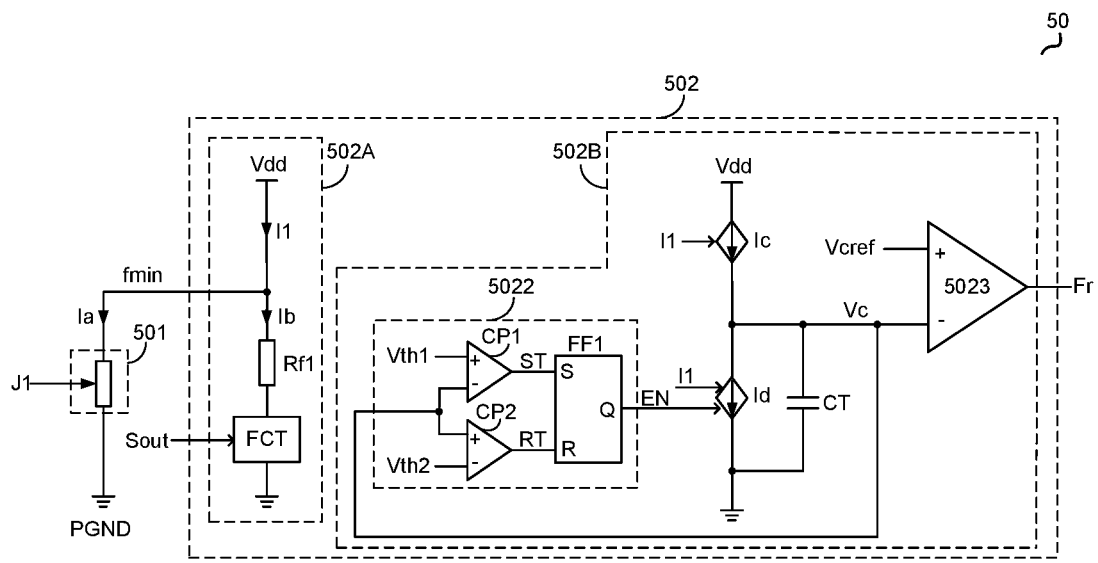
FIG. 5 schematically shows a frequency generating circuit 50 in accordance with an embodiment of the present invention.

FIG. 5 schematically shows a frequency generating circuit 50 in accordance with an embodiment of the present invention. As shown in FIG. 5, the frequency generating circuit 50 includes a minimum frequency selecting circuit 501 and a current-frequency converting circuit 502. In one embodiment, when the frequency generating circuit 50 is utilized with the power system 30 in FIG. 3, the current-frequency converting circuit 502 may be utilized as part of the control unit 305.

The minimum frequency selecting circuit 501 has a first terminal coupled to the current-frequency converting circuit 502, a second terminal connected to the primary ground reference PGND, and a control terminal configured to receive the selecting signal J1. The minimum frequency selecting circuit 501 presents as a resistor with an equivalent resistance Rfmin determined by the selecting signal J1. The minimum frequency selecting circuit 501 may include a resistor matric behaving like a variable resistor controlled by the selecting signal J1.

The current-frequency converting circuit 502 has a first input terminal coupled to the minimum frequency selecting circuit 501 to receive the minimum frequency signal fmin, a second input terminal configured to receive the load information signal Sout, and an output terminal configured to provide a frequency signal Fr based on the minimum frequency signal fmin and the load information signal Sout. In FIG. 5, the minimum frequency signal fmin presents in the form of a current Ia flowing through the minimum frequency selecting circuit 501. The load information signal Sout may be the output voltage Vout, the output current Iout, other load indicating signals of the power systems of the present invention or any combination of one or more signals indicating the load information.

In the embodiment of FIG. 5, the current-frequency converting circuit 502 includes a current control circuit 502A, an oscillating circuit 502B. The oscillating circuit 502B includes a charging current source Ic, a discharging current source Id, a charge control circuit 5022, a capacitor CT and a comparator 5023. The charging current source Ic charges the capacitor CT to provide a capacitor voltage Vc. When the capacitor voltage Vc increases to an oscillating reference Vcref, the comparator 5023 flips, and provides the frequency signal Fr with a logic low state. The charge control circuit 5022 receives the capacitor voltage Vc, an upper threshold Vth1 and a lower threshold Vth2, and provides an enable signal EN based thereon. When the capacitor voltage Vc increases to an upper threshold Vth1, the enable signal EN enables the discharging current source Id to discharge the capacitor CT.

Then the capacitor voltage Vc decreases. When capacitor voltage Vc decreases to the oscillating reference Vcref, the comparator 5023 flips again, and provides the frequency signal Fr with a logic high state. When the capacitor voltage Vc decreases to a lower threshold Vth2, the enable signal EN disables the discharging current source Id. Then the capacitor CT is charged by the charging current source Ic again, the capacitor voltage Vc increases accordingly, and the operation repeats.

In the embodiment of FIG. 5, the charge control circuit 5022 comprises a first comparator CP1, a second comparator CP2 and a RS flip-flop FF1. The first comparator CP1 receives the capacitor voltage Vc and the upper threshold Vth1, and then provides a comparison signal ST to set the RS flip-flop FF1 when the capacitor voltage Vc increases to the upper threshold Vth1. The second comparator CP2 receives the capacitor voltage Vc and the lower threshold Vth2, and then provides a comparison signal RT to reset the RS flip-flop FF1 when the capacitor voltage Vc decreases to the lower threshold Vth2. The RS flip-flop FF1 provides the enable signal EN to enable the discharging current source Id when be set, and to disable the discharging current source Id when be reset.

The charging current source Ic and the discharging current source Id are controlled by a current I1 in the current control circuit 502A. As shown in FIG. 5, the current control circuit 502A includes a frequency control circuit FCT, and a resistor Rf1. The frequency control circuit FCT receives the load information signal Sout, and provides a current Ib flowing through the resistor Rf1 and the frequency control circuit FCT based thereon. Thus the current control circuit 502A has the current I1 which is a sum of the current Ia and the current Ib, i.e., I1=Ia+Ib. In FIG. 5, the current Ia flowing through the minimum frequency selecting circuit 501 is Ia=Vdd/Rfmin, wherein Vdd is a power supply voltage provided to the minimum frequency selecting circuit 501, and Rfmin represents the equivalent resistance of the minimum frequency selecting circuit 501. The current Ib is determined by the load information signal Sout.

In one embodiment, the charging current source Ic is controlled by the current I1 to provide a charging current equals to I1, and the discharging current source Id is controlled by the current I1 to provide a discharging current equal to 2×I1. In that case, an increasing slope and a decreasing slope of the capacitor voltage Vc are equal, which is I1/CT, wherein CT also represents a capacitance of the capacitor CT. The value of the oscillating reference Vcref determines a duty cycle of the frequency signal Fr, while the current I1 determines a frequency of the frequency signal Fr when the upper threshold Vth1 and the lower threshold Vth2 are fixed.

When the frequency generating circuit 50 is utilized with the power systems of the present invention, like the power system 30 in FIG. 3, the frequency signal Fr is applied to control the frequency of the drive control signal VG, thus to make the high side power switch P1 and the low side power switch P2 switch with a frequency determined by the frequency signal Fr. The frequency of frequency signal Fr is regulated by the current Ib which is determined by the load information signal Sout under a normal working condition, wherein the normal working condition refers to a working state that the associated resonant converter working with a frequency above the minimum switching frequency, and a minimum frequency working condition refers to a working state that the associated resonant converter working with the minimum switching frequency. Under the minimum frequency working condition, the current Ib is controlled by the frequency control circuit FCT to be zero, which leads to I1=Ia. As a result, the frequency of the frequency signal Fr is corresponds to the current Ia. As can be seen from FIG. 5, when the power supply voltage Vdd is fixed, the current Ia is determined by the equivalent resistance Rfmin of the minimum frequency selecting circuit 501, which is further determined by the selecting signal J1. That is to say, the minimum frequency of the frequency signal Fr is selected by the selecting signal J1.

It should be understood that the frequency generating circuit 50 in FIG. 5 is an example for illustrating how the selecting signal J1 controls the minimum frequency of the frequency signal Fr, i.e., the minimum frequency of the resonant converter. Many modifications and variations could be adopted. For example, the current I1 could regulate the upper threshold Vth1, the lower threshold Vth2 or the capacitance of the capacitor CT instead of the current of the charging current source Ic and the discharging current source Id. Furthermore, the current of the charging current source Ic and the discharging current source Id could have other relationships in other embodiments. Also, other oscillating circuit may be utilized to provide a frequency signal based on a current control signal.

Furthermore, as illustrated hereinbefore, the control unit and the minimum frequency selecting circuit may be implemented by digital circuits. In that case, the minimum frequencies are a plurality of frequency values stored in registers or in a lookup table, and could be selected by the selecting signal J1.

Figure 6:
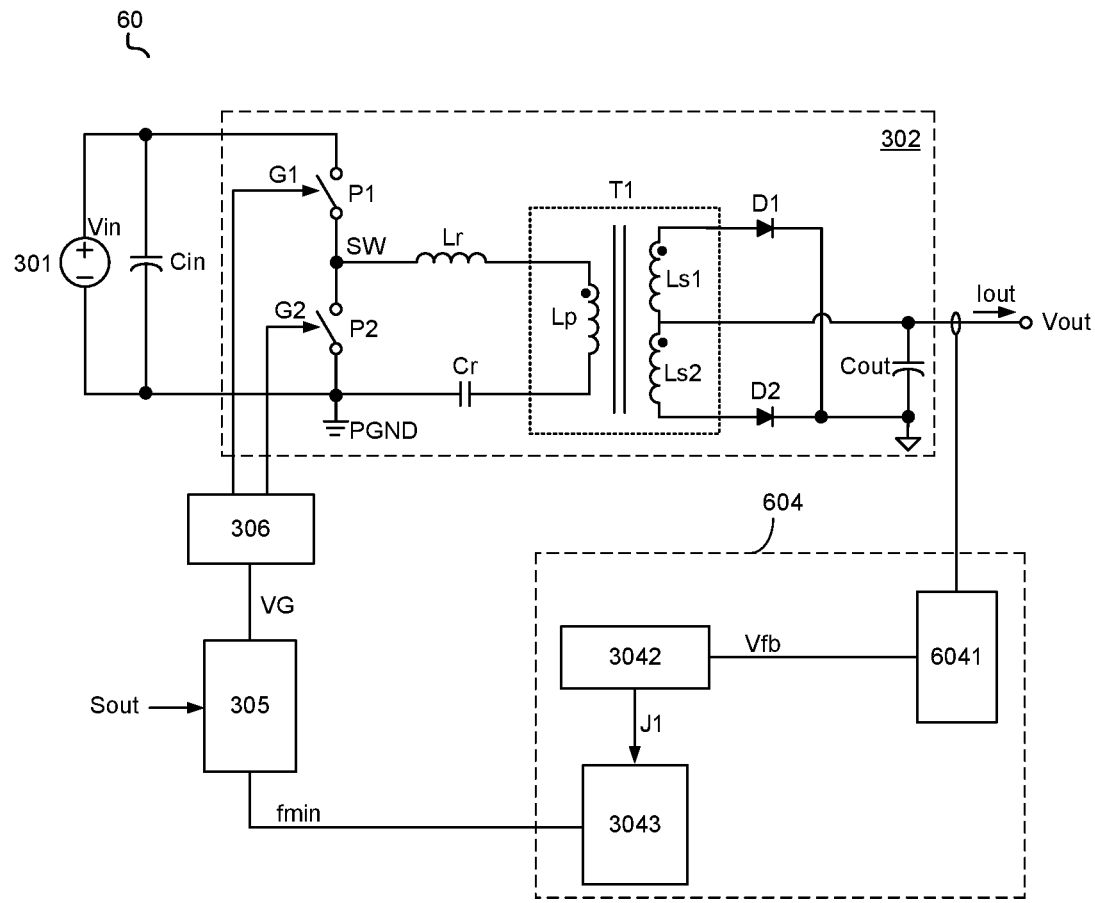
FIG. 6 schematically shows a power system 60 in accordance with an embodiment of the present invention.

FIG. 6 schematically shows a power system 60 in accordance with an embodiment of the present invention. As shown in FIG. 6, the power system 60 includes the power source 301, the resonant converter 302, a minimum frequency circuit 604, the control unit 305 and the drive circuit 306 which may be independent or may represent any combination of one or more components that provide the functionality of the power system 60 as described herein.

The minimum frequency circuit 604 includes: an output voltage detecting circuit 6041, the selecting signal generating circuit 3042 and the minimum frequency selecting circuit 3043. The output voltage detecting circuit 6041 has an input terminal coupled to the output terminal of the resonant converter 302 to detect the output voltage Vout of the resonant converter 302, and an output terminal configured to provide the feedback voltage Vfb indicative of the output voltage Vout. Compared with the embodiment in FIG. 3, the feedback voltage Vfb indicative of the output voltage Vout, instead of the equivalent resistance signal Rfb, is provided to the selecting signal generating circuit 3042. The feedback voltage Vfb is compared with at least one voltage threshold signals to generate the selecting signal J1. The rest of the power system 60 works similarly with the power system 30, and is not described here for brevity.

In one embodiment, the feedback voltage Vfb is compared with a voltage threshold Vref. When the feedback voltage Vfb is larger than the voltage threshold Vref, the minimum frequency signal fmin associated with a lower frequency is provided to the control unit 305, otherwise, a minimum frequency signal fmin associated with a higher frequency is provided to the control unit 305.

The output voltage detecting circuit 6041 may include any prior art voltage sense circuit and isolating feedback circuit, like a transformer or an optocoupler.

Figure 7:
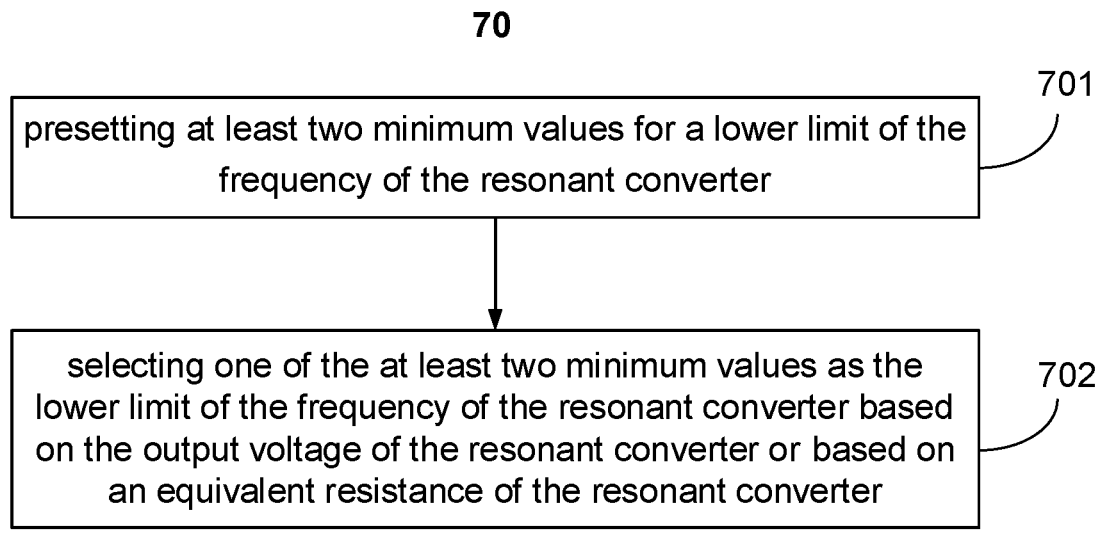
FIG. 7 shows a control method 70 for controlling a resonant converter in accordance with an embodiment of the present invention.

FIG. 7 shows a control method 70 for controlling a resonant converter in accordance with an embodiment of the present invention. The resonant converter may include any type of LLC converter, LCC converter, CLLC converter, CLLLC converter or the like. The resonant converter works with a frequency and provides an output voltage and an output current to a load. The control method 70 comprises: step 701, presetting at least two minimum values for a lower limit of the frequency of the resonant converter; and step 702, selecting one of the at least two minimum values as the lower limit of the frequency of the resonant converter based on the output voltage of the resonant converter or based on an equivalent resistance of the resonant converter, wherein the equivalent resistance is obtained by dividing the output voltage by the output current.

The at least two minimum values of the lower limit of the frequency, i.e., the minimum frequencies are preset according to the specs of the application. For example, persons of ordinary skill in the art could set a frequency corresponds to the peak of the gain curve, or a frequency on the right of the peak (as shown in FIG. 1) of the gain curve, as the minimum frequency of the corresponding gain curve. Then these minimum frequencies are divided to several groups according to different output voltage ranges, different equivalent resistance ranges, or other specs of the resonant converter. The largest minimum frequency in the group is preset as the minimum frequency for the associated output voltage range or the associated equivalent resistance range. As a result, by the selecting signal J1, the minimum frequency is selected for corresponding equivalent resistance or the corresponding output voltage of the resonant converter.

It should be known that presetting the minimum frequencies includes an iterative process, and requires simulation verification for each iteration due to high nonlinearity of the resonant converters.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated, and they obviously will be resorted to by those skilled in the art without departing from the spirit and the scope of the invention as hereinafter defined by the appended claims as only a preferred embodiment(s) thereof has been disclosed.

What is claimed is:
1. A power system, comprising:
  a resonant converter, configured to convert an input voltage to an output voltage to power a load;
  a control circuit, configured to provide a drive control signal for controlling the resonant converter working with a frequency having a minimum value varied based on the output voltage; and
  wherein the control circuit comprises:
    an output voltage detecting circuit, configured to provide a feedback voltage based on the output voltage;

a selecting signal generating circuit, configured to provide a selecting signal based on the feedback voltage; and a minimum frequency selecting circuit, configured to provide a minimum frequency signal based on the selecting signal for determining the minimum value of the frequency of the resonant converter, wherein the minimum frequency signal associated with a lower frequency is provided when the selecting signal indicates the feedback voltage is larger than a voltage threshold, and the minimum frequency signal associated with a higher frequency is provided when the selecting signal indicates the feedback voltage is less than the voltage threshold.

2. The power system of claim 1, wherein the output voltage detecting circuit comprises a transformer.

3. The power system of claim 1, wherein the output voltage detecting circuit comprises an optocoupler.

4. The power system of claim 1, wherein the minimum frequency selecting circuit comprises a look-up table providing the minimum frequency signal based on the selecting signal.

5. The power system of claim 1, wherein the control circuit further comprises a current-frequency converting circuit, and wherein:

the minimum frequency selecting circuit comprises a resistor matrix with a resistance determined by the selecting signal, and the current-frequency converting circuit provides the drive control signal with a minimum frequency determined by a current flowing through the resistor matrix.

6. A control circuit of a resonant converter, wherein the resonant converter provides an output voltage to power a load, comprising:

a minimum frequency circuit, configured to provide a minimum frequency signal based on the output voltage of the resonant converter;

a control unit, configured to provide a drive control signal for controlling the resonant converter working with a frequency having a minimum value determined by the minimum frequency signal; and wherein the minimum frequency circuit comprises:

an output voltage detecting circuit, configured to provide a feedback voltage based on the output voltage;

a selecting signal generating circuit, configured to provide a selecting signal based on the feedback voltage; and a minimum frequency selecting circuit, configured to provide the minimum frequency signal based on the selecting signal, wherein the minimum frequency signal determines a lower frequency when the selecting signal indicates the feedback voltage is larger than a voltage threshold, and the minimum frequency signal determines a higher frequency when the selecting signal indicates the feedback voltage is less than the voltage threshold.

7. The control circuit of claim 6, wherein the minimum frequency selecting circuit comprises a look-up table providing the minimum frequency signal based on the selecting signal.

8. The control circuit of claim 6, wherein the control unit comprises a current-frequency converting circuit, and wherein:

the minimum frequency selecting circuit comprises a resistor matrix with a resistance determined by the selecting signal, and the current-frequency converting circuit provides the drive control signal with a minimum frequency determined by a current flowing through the resistor matrix.

9. A control circuit of a resonant converter, wherein the resonant converter provides an output voltage and an output current to power a load, comprising:

a minimum frequency circuit, configured to provide a minimum frequency signal based on the output voltage of the resonant converter; and a control unit, configured to provide a drive control signal for controlling the resonant converter working with a frequency having a minimum value determined by the minimum frequency signal; and wherein the minimum frequency circuit comprises:

an equivalent resistance detecting circuit, configured to provide an equivalent resistance signal based on the output voltage and the output current;

a selecting signal generating circuit, configured to provide a selecting signal by comparing the equivalent resistance signal with a resistance threshold signal; and a minimum frequency selecting circuit, configured to provide the minimum frequency signal based on the selecting signal, wherein a first minimum frequency is determined by the minimum frequency signal when the selecting signal indicates the equivalent resistance signal is smaller than the resistance threshold signal, and a second minimum frequency is determined by the minimum frequency signal when the selecting signal indicates the equivalent resistance signal is larger than the resistance threshold signal, and the second minimum frequency is less than the first minimum frequency.

10. The control circuit of claim 9, wherein the minimum frequency selecting circuit comprises a look-up table providing the minimum frequency signal based on the selecting signal.

11. The control circuit of claim 9, wherein the control unit comprises a current-frequency converting circuit, and wherein:

the minimum frequency selecting circuit comprises a resistor matrix with a resistance determined by the selecting signal; and the current-frequency converting circuit provides the drive control signal with a minimum frequency determined by a current flowing through the resistor matrix.

\* \* \* \* \*